Oct. 16, 1934.     R. A. MAYPOLE     1,977,317
CHILD'S PROPELLED VEHICLE
Filed July 1, 1933     2 Sheets-Sheet 1
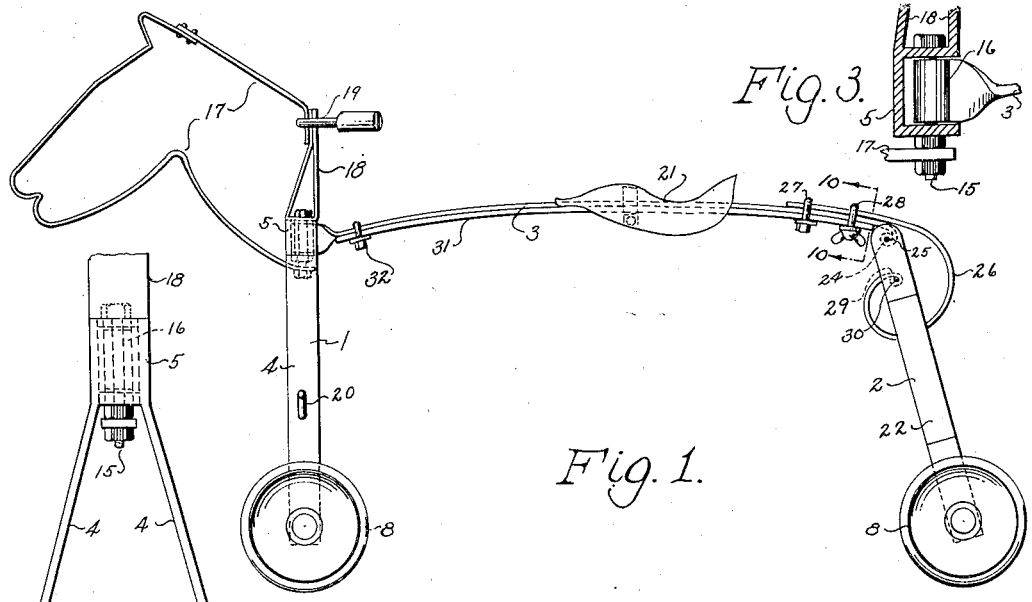
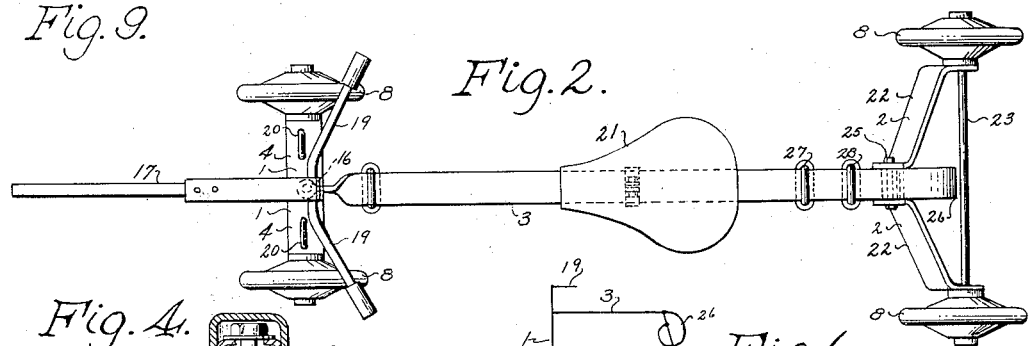
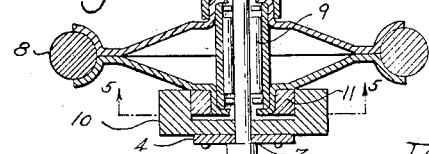
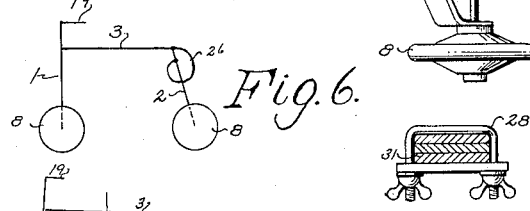
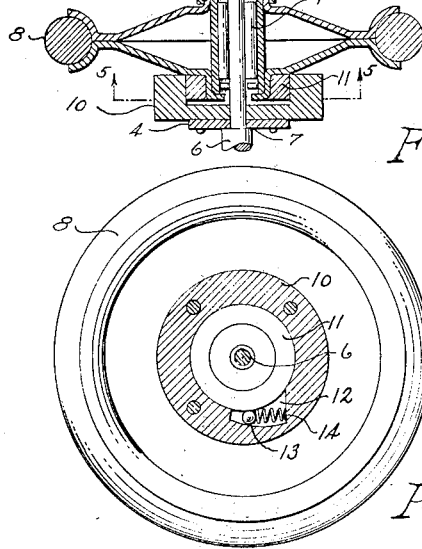
INVENTOR
Roy A. MAYPOLE.
BY
ATTORNEYS Oct. 16, 1934.     R. A. MAYPOLE     1,977,317
CHILD'S PROPELLED VEHICLE
Filed July 1, 1933     2 Sheets-Sheet 2
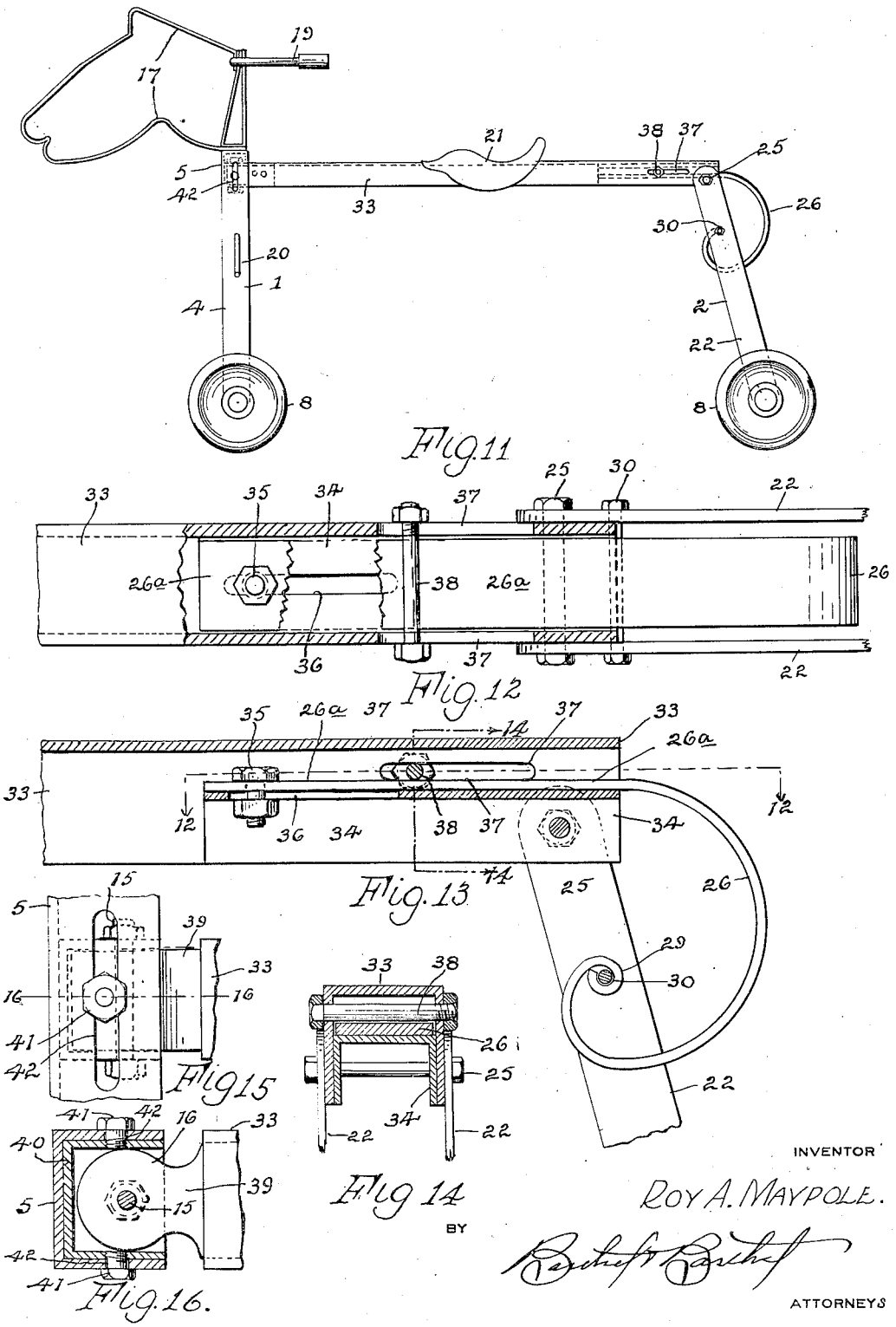

Patented Oct. 16, 1934

1,977,317

UNITED STATES PATENT OFFICE 1,977,317

CHILD'S PROPELLED VEHICLE

Roy A. Maypole, Detroit, Mich.

Application July 1, 1933, Serial No. 678,579

12 Claims. (Cl. 208—38)

This invention relates to a child's propelled vehicle and more particularly to a device in the nature of a hobby horse on wheels. The object of the invention is to provide a device of this character which is of very simple construction and cheap to manufacture and is particularly strong and rigid. A further object is to provide such a device designed to be formed principally from flat metal strip material which may be quickly and easily fabricated and assembled, to provide the desired construction. It is also an object to provide a device of this character, the rear frame portion of which is arranged to simulate the rear legs of the hobby horse and which frame is operated to propel the device forwardly, by means of a spiral spring, preferably of involute form which is so connected to said rear frame of the device as to operate in swinging this frame in a manner to simulate the motions of the rear legs of a horse in galloping, this spring also serving to limit the swinging movement of the frame and thus obviate the necessity for providing means to limit such swinging movement.

It is also an object to provide certain other new and useful features in the construction and arrangement of parts, all as hereinafter more fully described and particularly pointed out in the appended claims, reference being had to the accompanying drawings in which, Figure 1 is a side elevation of a child's vehicle illustrative of an embodiment of the present invention;

Fig. 2 is a plan view of the same;

Fig. 3 is a vertical section showing the pivotal attachment of the reach member to the forward frame simulating the forward legs of the horse;

Fig. 4 is a horizontal section through one of the ground wheels and its supporting and driving means;

Fig. 5 is a section substantially upon the line 5—5 of Fig. 4;

Figs. 6, 7 and 8 are diagrammatic views illustrating the operation of the device in propelling the vehicle forwardly;

Fig. 9 is an enlarged detail showing the upper part of the front leg frame and its pivotal connection to the reach member;

Fig. 10 is a transverse section substantially upon the line 10—10 of Fig. 1;

Fig. 11 is a view similar to Fig. 1 and showing a modified construction;

Fig. 12 an enlarged sectional view of the rear end portion of the device substantially upon the line 12—12 of Fig. 13;

Fig. 13 a longitudinal section of Fig. 12;

Fig. 14 a transverse section on the line 14—14 of Fig. 13;

Fig. 15 a detail showing a side elevation of a front end portion of the reach member and its connection with the front leg frame; and Fig. 16 is a section upon the line 16—16 of Fig. 15.

This device consists essentially of a front leg frame indicated as a whole by the numeral 1, a rear leg frame indicated as a whole by the numeral 2, and a reach member indicated as a whole by the numeral 3 which connects the upper ends of the front and rear frames. These frames, for the purpose of cheapness in construction, are formed principally of flat metal strip material formed into a frame including leg members 4 which are connected together at their upper ends by a head 5 and diverge downwardly therefrom to the ends of a front axle 6 which is mounted within suitable bearings in these ends of the leg members. Mounted upon the outer ends of the axle 6, which ends are preferably reduced in diameter to provide a shoulder 7, are ground wheels 8 of any suitable form and construction, these wheels being each mounted upon the axle by a suitable roller bearing 9, and secured to the lower end of each leg member, through which end the reduced end of the axle extends, is a circular casing 10 which is fixed against rotation by being secured to the end of the adjacent leg 4 in any suitable manner, this casing enclosing a ring member 11 which is secured to the hub of the wheel 8 to turn freely with the wheel within the recess of the casing member 10. This casing member is formed with one or more notches or recesses 12, adapted to receive a ball or roller clutch 13, the notch or recess being of tapered formation so that the ball or roller when forced forwardly by a spring 14, will wedge between a wall of the notch and the external surface of the ring 11 and prevent the wheel from rotating in a rearward direction but permitting a free rotation of the wheel in a forward direction.

The head 5 at the upper end of the legs 4 is of U shape in cross section and the sides of this U-shaped frame provide bearings for a vertical pivot bolt 15 which passes through an eye member 16 on the forward end of the reach 3 to pivotally connect the forward frame 1 with said reach.

Secured to the head 5 and frame 1 in any suitable manner which is detachable for purposes of packing, is a device formed of a flat strip of metal and bent to simulate the outline of a horse's head as at 17, the rear or neck portion of this head being mounted upon the upper end of the head 5 and detachably secured thereto by means of a suitable upstanding support 18 preferably formed of strap iron and to the upper end of which a handle bar 19 is attached so that by means of this handle bar the front frame 1 may be turned upon the pivot bolt 15 in directing the course of the vehicle. The leg portions 4 of this frame are provided with laterally projecting stirrup members 20 upon which the rider of the vehicle may place his feet and secured upon the reach member 3 in any suitable manner, preferably so that it may be adjusted longitudinally thereof, is a seat 21 upon which the child may sit with his feet upon the stirrup members 20.

The rear leg frame 2 is in a similar manner formed from strip metal to provide leg portions 22, through openings in the lower ends of which a rear axle 23 projects and mounted upon this rear axle are wheels similar to the forward wheels 8 and these rear wheels are mounted upon and connected to the axle in the same manner in which the forward wheels are mounted upon the forward axle, the same form of clutch casing 10, internal hub ring 11, and clutch 13 being employed so that these rear wheels may rotate freely in a forward direction but will be prevented from rotating in a rearward direction.

A suitable eye 24 is provided at the rear end of the reach member 3 and the legs 22 engage the ends of this eye and are attached thereto by means of a pivot bolt 25 passing through openings in the ends and through the eye. To resist the swinging movement of their rear frame 2 upon the rear end of the reach member 3, a flat spring 26 of spiral formation, and more particularly of involute form, is provided, the extended upper end of this spring being adjustably secured to the upper side of the rear end of the reach member 3 by means of clips 27 and 28, and the center or axis end of this spring 26 is formed with an eye 29 to receive a pivot bolt 30 passing through the legs and through this eye. Thus the involute spring yieldingly resists both forward and rearward swinging of the rear leg frame 2 upon its pivotal connection with the rear end of the reach.

The reach member 3 as shown, is made up of a plurality of flat strips of spring steel simulating a leaf spring, but it will be understood that this member may be in the form of a rigid bar if so desired. However, by making this reach in the form of a leaf spring, one of the leaves may be twisted and formed into an eye at its forward end to receive the pivot bolt 15, thus cheapening the construction and by providing one or more additional leaves, such as the leaf 31 shown, the resistance to bending of this reach member may be increased as desired depending upon the weight of the child who is to ride on the vehicle. The forward end of the leaf 31 is secured to the main leaf by means of a clip 32 and at its rear end it is secured to this main leaf by means of the clips 27 and 28, the main leaf being formed at its extreme rear end into an eye to receive the pivot bolt 25 for the rear leg frame. This reach member may thus be adjusted to increase or decrease its flexibility and by adjusting the clip 28 along the extended arm portion of the spring 26, the yieldability of this spring may be also adjusted to vary its flexibility according to the weight of the rider. The flexibility or bending action of the reach member will aid in propelling the vehicle although such flexibility is not necessary, this flexing of the reach intermediate its ends downwardly, tending to deflect the frame members 1 and 2, thus rolling the forward wheels along the ground and spreading the frame members upon which the wheels are mounted, further apart; and upon the recoil of this spring reach, this force will be applied to roll the rear wheels forwardly, due to the fact that these wheels are permitted to roll in a forward direction only.

The device is propelled forwardly by the shifting of the weight of the rider thereon, that is, with his feet upon the stirrups 20 or on the ground and his hands upon the handle bar 19, he will throw his weight toward the head end of the vehicle and then let himself down with his full weight upon the seat 21, which will flex the spring 26, causing the upper end of the frame member 2 to swing forwardly, thus pushing the forward leg member 1 forward due to the fact that the rear wheels are prevented from rolling rearwardly on the ground. He will then again raise himself or shift his weight forwardly, relieving the rear end of the reach member, to some extent, of such weight, and thus permit the recoil of the spring 26 to swing the rear leg frame forwardly, the wheels thereof rolling forwardly on the ground.

Due to the form of the spring 26 and to the relative positions of the eyes 24 and 29, the rear leg frame will not be swung forwardly of the normal position in which it is held by the spring, and therefore no stop is necessary to prevent this rear leg frame from swinging past center or too far forwardly, thus permitting a downward movement of the rear end of the reach. As no such stop is necessary, the danger of a child getting his fingers caught between the stop and the frame is eliminated and further, the construction of the whole device is such that there is no place in which a small child may get his fingers caught accidentally or otherwise.

The form of the involute spring 26 is not only of importance in the construction of the device but it gives a motion to the rear leg frame which more closely approximates the motion of the rear legs of a horse when galloping and this spring also forms a downwardly curved or rounded rear end to the device.

As shown in Figs. 11 to 16 inclusive, the reach member connecting the front and rear leg frames, instead of being flexible is non-bendable, it being formed of a downwardly open U-shaped channel bar 33 within the rear open end of which the flat forwardly extended end portion 26a of the involute spring 26 is secured flat against the upper side of a short inner channel bar 34 secured in any suitable manner within the main or outer channel between the side flanges thereof, with its lower side open downwardly. The forward end of this extension 26a is adjustably secured to the upper or bottom wall of said channel bar 34, by means of a bolt 35 passing through a hole in said portion 26a and through a longitudinal slot 36 in said wall of said bar with a nut on said bolt within said channel which nut may be loosened to permit said spring to be moved longitudinally upon said inner channel bar to adjust said spring so that it will project to a greater or lesser degree from the rear end of the main reach bar, to increase or decrease the flexibility of said spring and to also swing and hold the rear leg frame at different degrees of angularity relative to said reach. Thus by adjusting said spring outwardly, the rear leg frame will be swung rearwardly due to the pivotal connection of the center of the coil with said leg frame by the pivot 30 and the rear end of the reach will thus be lowered to adjust the same for height from the ground to accommodate a small child.

To provide a further adjustment of the resistance of said spring against flexing, the side flanges of the main channel bar 33 are provided with longitudinal slots 37 above the plane of the upper side of the spring extension 26a which normally lies flat upon the upper side of the inner channel 34, and extending transversely of said bars and through said slots, is an abutment bolt, rod or bar 38 in contact with the upper side of this spring extension 26a, so that by loosening a nut upon the outer end of said bolt, said bolt may be adjusted in said slots along said extension and thus shorten or lengthen the effective bending length of said spring.

To adjust the forward end of said reach for height from the ground and also provide a suitable pivotal connection for said reach to the forward leg frame, a pivot head 39 is secured within the forward end of the channel bar 33 and this head is formed with a projecting eye similar to the eye 16 to receive the vertical pivot bolt 15 upon which said frame turns relative to said reach in steering the vehicle. In order that this pivot bolt may be adjusted vertically relative to said leg frame and thus adjust the forward end of the reach upon said frame, said bolt is mounted within a box or slide 40 fitting within the head 5 of the leg frame 1 and adapted to be adjusted vertically within said head and held in adjusted position, by screws 41 tapped into the side walls of said slide and extending through slots 42 in the side flanges or walls of said head 5. Thus by loosening these screws 41, the slide 40 may be moved up or down in said head to raise or lower this connection of the forward end of the reach with the forward leg frame, and then by tightening these screws to draw their heads into firm contact with the outer surfaces of the sides of said head 5, said slide is firmly held in the position to which it is adjusted. Obviously any suitable pivotal connection between said leg frame head and forward end of said reach may be provided and this connection arranged in any suitable manner so that it may be adjusted to vary the height from the ground of said reach end to correspond with the height adjustment of its rear end, effected by the longitudinal adjustment of the extended portion 26a of the spring 26 from the rear end of said reach.

While I have shown a particular construction it is obvious that changes may be made therein without departing from the spirit of the invention and I do not therefore limit myself to the particular construction and arrangement shown.

Having thus fully described my invention what I claim is:

1. In a device of the character described, the combination of a longitudinal member adapted to support the weight of the rider, a leg member pivotally attached to said longitudinal member and having means to roll upon the ground in one direction only, a resilient member rigidly secured at one end of said longitudinal member and pivotally attached at its opposite end to said leg member and so positioned relative to said pivotal attachment of said leg member to said longitudinal member as to prevent said leg member from swinging past the vertical plane of the axis of said pivot and adapted to yield and permit said leg member to swing upon said pivot in one direction and by its resiliency to return said leg member to the position in which it is normally and yieldingly held by said yielding member upon reduction of weight upon said longitudinal member.

2. In a device of the character described, the combination of a longitudinal member adapted to support the weight of the rider, and propelling means including a leg member pivotally attached at its upper end to said longitudinal member and provided at its lower end with means adapted to roll upon the ground in one direction only, and a flat spring member of involute characteristics with an extended end portion secured to said longitudinal member and pivotally connected at the axis of its coil to said leg member below the pivotal connection of said leg member to said longitudinal member.

3. In a device of the character described, the combination of a front leg member, a rear leg member, a reach member connected at its forward end to the upper end of said front leg member and pivotally connected at its rear end to the upper end of said rear leg member, ground engaging means at the lower ends of said leg members to roll upon the ground, means for preventing certain of said ground engaging means from rotating rearwardly, and a flat spiral spring secured at one end to the rear end of said reach member and pivotally connected at the axis of its spiral to said rear leg member below the pivotal attachment of said member to said reach member.

4. A device of the character described comprising a front leg frame, a rear leg frame, a reach member forming the sole connection between said frames, the forward end of said reach member being pivotally connected to the upper end of the forward leg frame by a vertical pivot and the rear end of said reach member being pivotally connected to the upper end of the rear leg frame by a transverse pivot, a seat upon said reach member for the support of a person, a handle bar connected to said forward leg frame for turning said frame upon its pivot in steering the device, wheels upon the lower ends of said leg frames to roll upon the ground, means for preventing backward rotation of certain of said wheels, and a spring rigidly secured at one end to said reach member and pivotally attached at its opposite end to said rear leg frame.

5. In a device of the character described, the combination of a front leg frame having ground engaging wheels at its lower end and a head at its upper end, a rear leg frame having ground engaging means at its lower end, a reach member pivotally connected at its forward end to said head of said forward leg frame by means of a vertical pivot and pivotally connected at its rear end to the upper end of said rear leg frame, said reach member being provided with means forming a seat for the rider and said head of said forward leg frame being provided with means for steering the device, and a flat spiral spring having an extended end portion adjustably secured to the rear end portion of said reach member and formed with an eye at the axis of said spiral for pivotal attachment to said rear leg frame at a distance below the point of pivotal attachment of said frame to the rear end of said reach member.

6. In a device of the character described, the combination of a front leg frame, a rear leg frame, a laterally yieldable reach member pivotally connected at its ends to the upper ends of said leg frames and provided with a seat for the rider intermediate its ends, means at the lower ends of said leg frames for rolling upon the ground in a forward direction only, a flat spiral spring pivotally connected at the axis of said spiral to said rear leg frame below the pivotal connection thereof with said reach member and curved rearwardly and upwardly with a forwardly extending end portion engaging the rear end portion of said reach member, and means for adjustably securing said extended end portion of said spring to said reach member.

7. A device of the character described comprising a front leg member having means at its lower end to roll upon the ground, a rear leg member having means at its lower end to roll upon the ground, means for preventing backward rotation of said leg member means, a reach member connected at its ends to the upper ends of said leg members and forming the sole connection therebetween and formed of a plurality of spring leaves, and a seat for the rider mounted upon said reach member.

8. In a device of the character described, the combination of a front leg frame having a head open at its rear side, means at the lower end of said leg frame to roll upon the ground, a rear leg frame, means at the lower end of said rear frame to roll upon the ground in one direction only, a reach member connecting the upper ends of said leg frames and formed of a plurality of spring leaves adapted to yield in a downward direction intermediate its ends, one of the said leaves being formed at its forward end into an eye to engage within the head of said forward leg frame, a vertical pivot member having a bearing in said head and passing through said eye to pivotally connect said front leg frame to the forward end of said reach, a handle bar for said forward leg frame for turning the same upon its pivotal connection with said reach, and a seat mounted upon said reach intermediate the ends thereof to support the rider.

9. In a device of the character described, the combination of a front leg frame having a head at its upper end and downwardly diverging leg members, an axle having bearings at the lower ends of said leg members, ground wheels upon the ends of said axle, a bracket member formed of strip metal secured to said head with an extension extending forwardly therefrom and formed of strip metal bent to simulate the outline of a horse's head, a handle bar secured to said bracket, a rear leg frame formed with downwardly diverging leg members, an axle carried by the lower ends of said leg members, wheel upon the ends of said axle, means for preventing rotation of said wheels in one direction, a reach formed of a plurality of spring leaves with the forward end of said reach pivotally connected to the head of said forward leg frame, said reach being formed at its rear end with an eye to receive a pivot bolt for connecting the upper end of the rear leg frame with the rear end of said reach, and a flat spiral spring pivotally connected at the axis of its spiral to said rear leg frame below the pivotal connection of said frame with said reach, said spring having an extended end portion engaging and adjustably secured to the rear end of said reach.

10. In a device of the character described, the combination of front and rear leg members, a single rigid reach member connecting the upper ends of said leg members and to the forward end of which said forward leg member is pivotally connected to turn upon an upwardly extending pivot in steering the device and to the rear end of which reach said rear leg member is pivoted to swing forwardly and backwardly, means at the lower ends of said leg member to roll upon the ground, yieldable means to swing said rear leg member forwardly, said means being adjustable to increase the normal rearward inclination of said rear leg member and decrease the normal height of said reach from the ground, and adjustable means for varying the height of the forward end of said reach member from the ground.

11. In a device of the character described, the combination of forward and rear leg members, means on the lower ends of certain of said leg members to engage the ground and cause said device to advance in one direction only, a rigid channel shaped reach member forming the sole connection between the upper ends of said leg members and to which said forward leg member is pivotally connected to turn upon an upwardly extending axis and to which said rear leg member is pivotally connected to swing forwardly and rearwardly, and a spiral spring having an end extension adjustably secured to the rear end of said reach and pivotally connected to said rear leg member at the axis of said spiral.

12. In a device of the character described, the combination of a forward leg member, a rear leg member, a reach member of channel form to the forward end of which said forward leg member is connected to turn upon an upwardly extending axis and is vertically adjustable and to the rear end of which reach member said rear leg member is pivotally connected to swing forwardly and backwardly, a flat spiral spring having an extended end portion extending longitudinally into the rear end of said reach member and formed with an eye at the axis of said spiral for pivotally connecting said spring to said rear leg member, means within said rear end of said reach member for adjustably securing said extended end portion of said spring to said reach, and adjustable means carried by said reach for resisting the flexing of said spring.

ROY A. MAYPOLE.